United States Patent
Kiciak et al.

(10) Patent No.: US 10,051,638 B2
(45) Date of Patent: Aug. 14, 2018

(54) METHOD FOR ENHANCED POLICY AND CHARGING CONTROL IN TELECOMMUNICATIONS NETWORKS

(71) Applicant: DEUTSCHE TELEKOM AG, Bonn (DE)

(72) Inventors: Paul Kiciak, Vienna (AT); Karl Berger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/326,036

(22) PCT Filed: Jun. 2, 2015

(86) PCT No.: PCT/EP2015/062187
§ 371 (c)(1),
(2) Date: Jan. 13, 2017

(87) PCT Pub. No.: WO2016/008634
PCT Pub. Date: Jan. 21, 2016

(65) Prior Publication Data
US 2017/0215196 A1    Jul. 27, 2017

(30) Foreign Application Priority Data

Jul. 17, 2014   (EP) .................................... 14177524
Jul. 25, 2014   (EP) .................................... 14178602

(51) Int. Cl.
*H04W 72/04*    (2009.01)
*H04M 15/04*    (2006.01)
(Continued)

(52) U.S. Cl.
CPC ....... *H04W 72/0493* (2013.01); *H04W 12/08* (2013.01); *H04M 15/64* (2013.01); *H04W 88/16* (2013.01)

(58) Field of Classification Search
CPC ................. H04M 15/00; H04M 17/00; H04M 2215/2026; H04M 2215/32; H04W 4/24
See application file for complete search history.

(56) References Cited

U.S. PATENT DOCUMENTS 7,366,290 B2 *   4/2008   Ritter ................... G06Q 20/102
                                                    379/114.17
2013/0086253 A1   4/2013   Cutler et al.
(Continued)

FOREIGN PATENT DOCUMENTS

| WO | WO 2011057651 A1 | 5/2011 |
| WO | WO 2013072037 A1 | 5/2013 |
| WO | WO 2014024109 A2 | 2/2014 |

OTHER PUBLICATIONS

"3rd Generation Partnership Project; Technical Specification Group Core Network and Terminals; Policy and Charging Control (PCC); Reference points (Release 12)", 3GPP Draft; Z_29212-050, 3rd Generation Partnership Project (§GPP), Mobile Competence Centre; 650, Route Des Lucioles; F06921 Sophia-Antipolis Cedex; France, Jun. 24, 2014 (Jun. 24, 2014), XP050809936.

*Primary Examiner* — Sharad Rampuria
(74) *Attorney, Agent, or Firm* — Leydig, Voit & Mayer, Ltd.

(57) ABSTRACT

A method for enhanced policy and/or charging control when a mobile telecommunications network is used by a user equipment corresponding to a subscriber of a mobile virtual telecommunications network includes; using, by the user equipment, a radio access network; collecting and/or generating, by a radio network element of the radio access network, subscriber-related policy and/or charging control data depending on the use of the radio access network by the user equipment; and transmitting the subscriber-related policy and/or charging control data, from the radio network
(Continued)

element to a policy and/or charging control entity, using at least one policy and/or charging control interface.

13 Claims, 2 Drawing Sheets

(51) Int. Cl.
*H04W 12/08* (2009.01)
*H04W 88/16* (2009.01)
*H04M 15/00* (2006.01)

(56) References Cited

U.S. PATENT DOCUMENTS

| 2013/0250838 A1* | 9/2013 | Liang | H04W 4/08 |
| | | | 370/312 |
| 2015/0038111 A1* | 2/2015 | Lopez Nieto | H04W 4/24 |
| | | | 455/406 |
| 2016/0353268 A1* | 12/2016 | Senarath | H04W 4/24 |
| 2017/0118616 A1* | 4/2017 | Kothari | H04W 4/24 |

* cited by examiner

METHOD FOR ENHANCED POLICY AND CHARGING CONTROL IN TELECOMMUNICATIONS NETWORKS

CROSS-REFERENCE TO RELATED APPLICATIONS

This application is a U.S. National Phase application under 35 U.S.C. § 371 of International Application No. PCT/EP2015/062187, filed on Jun. 2, 2015, and claims benefit to European Patent Application Nos. EP 14177524.7, filed on Jul. 17, 2014, and EP14178602.0, filed on Jul. 25, 2014. The International Application was published in English on Jan. 21, 2016, as WO 2016/008634 A1 under PCT Article 21(2).

FIELD

The present invention relates inter alia to a method for enhanced policy and/or charging control when a mobile telecommunications network is used by a user equipment corresponding to a subscriber of a mobile virtual telecommunications network.

BACKGROUND

In current telecommunications networks, especially mobile communication networks, policy and/or charging control is applied to users of the telecommunications network. The policy and charging control functionality is provided by a policy and charging control (PCC) architecture and encompasses two main functions:
  Event and Session Based Charging, including charging control and online credit control;
  Policy control (e.g. gating control, Quality of Service (QoS) control, QoS signalling, etc.).
  The policy and charging control (PCC) functionality comprises the functions of the policy and charging enforcement function (PCEF), the bearer binding and event reporting function (BBERF), the policy and charging rules function (PCRF), the application function (AF), the traffic detection function (TDF), the online charging system (OCS), the offline charging system (OFCS) and the subscription profile repository (SPR) or the user data repository (UDR).
  The policy and charging rules function (PCRF) encompasses policy control decision and flow based charging control functionalities. The PCRF provides network control regarding the service data flow detection, gating, QoS and flow based charging (except credit management) towards the policy and charging enforcement function (PCEF).
  The policy and charging enforcement function (PCEF) encompasses service data flow detection, policy enforcement and flow based charging functionalities. This functional entity is usually located at the gateway entity (e.g. GGSN (Gateway GPRS Support Node) in the General Packet Radio Service (GPRS) case, and SGW (serving gateway) in the Long Term Evolution (LTE) or wireless local area network (WLAN) case). It provides service data flow detection, user plane traffic handling, triggering control plane session management (where the IP-CAN (IP connectivity access network) permits), QoS handling, and service data flow measurement as well as online and offline charging interactions. The online charging system (OCS) performs the service data flow based credit control function.

SUMMARY

In an exemplary embodiment, the invention provides a method for enhanced policy and/or charging control when a mobile telecommunications network is used by a user equipment corresponding to a subscriber of a mobile virtual telecommunications network. The mobile telecommunications network comprises a first core network, a second core network and a radio access network, wherein the radio access network comprises a radio network element being connected to the first and second core networks, wherein the first core network is operated by a first mobile network operator, wherein the second core network and the radio access network are operated by a second mobile network operator, wherein the radio access network is shared among the first and second mobile network operators, wherein the first core network comprises at least one packet data core element and a policy and/or charging control entity. The method includes: using, by the user equipment, the radio access network; collecting and/or generating, by the radio network element of the radio access network, subscriber-related policy and/or charging control data depending on the use of the radio access network by the user equipment; and transmitting the subscriber-related policy and/or charging control data, from the radio network element to the policy and/or charging control entity, using at least one policy and/or charging control interface. The at least one policy and/or charging control interface comprises: a first policy and/or charging control interface related to a direct communication between the radio network element of the radio access network and the policy and/or charging control entity of the first core network, or a second policy and/or charging control interface related to a direct communication between the packet data core element and the policy and/or charging control entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
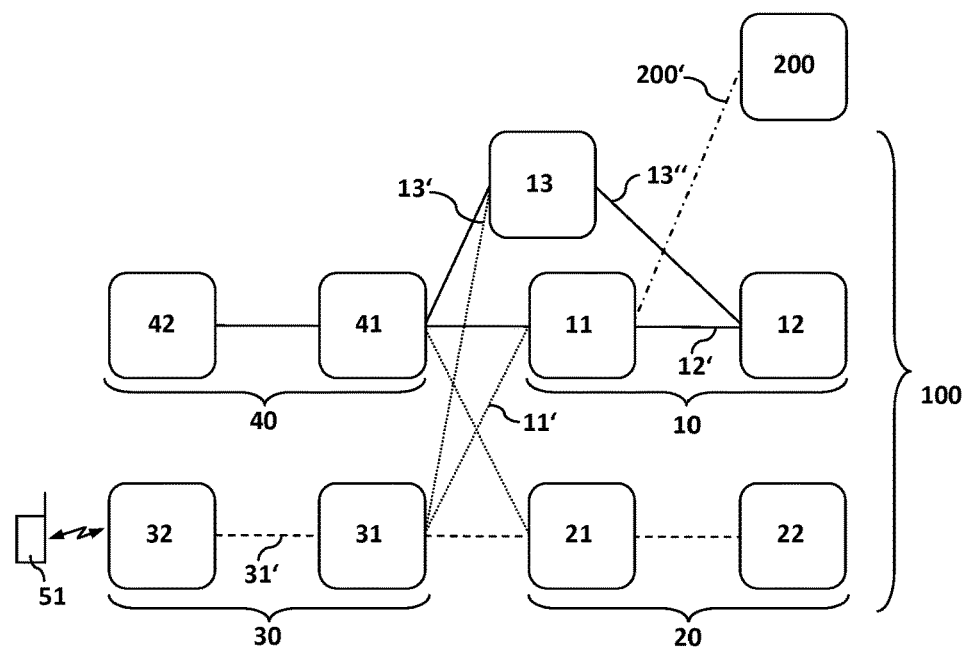
FIG. 1 schematically illustrates a mobile telecommunications network according to an embodiment of the present invention.

In certain situations it may be necessary to apply policy and/or charging control to a shared mobile telecommunications network in which network resources of the mobile telecommunications network are shared with a mobile virtual network. In such situations it may not always be possible for the mobile network operator of the mobile telecommunications network to maintain full control over policy and/or charging within his own network. In particular, the number of network elements under control of the mobile network operator may decrease with decreasing number of shared network elements.
  In an exemplary embodiment, the present invention provides a method for enhanced policy and/or charging control when a mobile telecommunications network is used by a user equipment corresponding to a subscriber of a virtual mobile network, wherein preferably full control over policy and/or charging is maintained even when network resources of the mobile telecommunications network are shared with an operator of a virtual mobile network.

In an exemplary embodiment, the present invention provides a method for enhanced policy and/or charging control when a mobile telecommunications network is used by a user equipment corresponding to a subscriber of a mobile virtual telecommunications network, wherein the mobile telecommunications network comprises a first core network, a second core network and a radio access network, wherein the radio access network comprises a radio network element being connected to the first and second core network, wherein the first core network is operated by a first mobile network operator, wherein the second core network and the radio access network are operated by a second mobile network operator, wherein the radio access network is shared among the first and second mobile network operator, wherein the first core network comprises at least one packet data core element and a policy and/or charging control entity, wherein the method comprises the steps of:

using, by the user equipment, the radio access network,
collecting and/or generating, by the radio network element of the radio access network, subscriber-related policy and/or charging control data depending on the use of the radio access network by the user equipment,
transmitting the subscriber-related policy and/or charging control data, from the radio network element to the policy and/or charging control entity, using at least one policy and/or charging control interface, wherein the at least one policy and/or charging control interface comprises:
a first policy and/or charging control interface related to a direct communication between the radio network element of the radio access network and the policy and/or charging control entity of the first core network, or
a second policy and/or charging control interface related to a direct communication between the packet data core element and the policy and/or charging control entity.

According to the present invention, it is advantageously possible to enable the first mobile network operator to maintain full control over policy and/or charging within the first core network and the radio access network of the mobile telecommunications network even in case that roaming, national roaming or network sharing is used. In particular, the first mobile network operator maintains full control over charging and/or policy regardless of the number of core network resources of the first core network being shared with the virtual mobile network. Preferably, the first and second policy and/or charging control interface are realized in the mobile telecommunications network such that either the first or second policy and/or charging control interface is selected, by the first core network, depending on a range of network sharing or roaming (i.e. depending on the number of network elements of the first core network 10 being shared) with the mobile virtual network operator.

According to a preferred embodiment of the present invention, the at least one policy and/or charging control interface—preferably at least one policy control, offline charging and/or online charging interface—are realized in the radio access network and/or in the first core network. Preferably, this means that the radio network element of the radio access network comprises the first policy and/or charging control interface and that the at least one packet data core element comprises the second policy and/or charging control interface. It is thereby advantageously possible to minimize the number of interfaces being used, by the mobile network operator, for a full access to the radio access network in order to realize policy and/or charging control in a shared mobile telecommunications network. It is preferred according to the present invention that the first policy and/or charging control interface is realized at the last shared radio network element (i.e. shared with the mobile virtual network operator) of a chain of radio network elements of the radio access network, wherein the expression "last" radio network element preferably refers to the radio network element being located topologically closer to the first core network than all other radio network elements of the radio access network. Preferably, the first policy and/or charging control interface is configured as a Ro interface of an online charging system.

According to a further preferred embodiment of the present invention, the subscriber related policy and/or charging control data are transmitted, via the second policy and/or charging control interface of a packet core gateway element of the first core network, from the radio network element to the policy and/or charging control entity, wherein preferably a Rf, Ro, Bx, Gy and/or Sy interface according to the 3GPP TS 32.296 is used.

It is also possible and preferred according to the present invention that a direct communication is a transmission of data packets comprising (in particular in the header of the data packet) an communication protocol address of at least one of the communication partners of the direct communication.

It is also possible and preferred according to the present invention that the network parts of the mobile virtual network operator, the first mobile network operator and/or the second mobile network operator are connected using multi-operator radio access network (MORAN), multi-operator core network (MOCN), national roaming and/or other network sharing architectures.

It is preferred according to the present invention that the first policy and/or charging control interface is a dedicated policy and/or charging control interface being configured for direct communication between the radio network element and the policy and/or charging control entity, wherein the method comprises the further step of:

transmitting the subscriber-related policy and/or charging control data from the radio network element to the policy and/or charging control entity using the first policy and/or charging control interface. Furthermore, it is preferred according to the present invention that the at least one policy and/or charging control interface comprises only the first policy and/or charging control interface.

Thereby, it is advantageously possible according to the present invention that the first mobile network operator maintains full control over charging and/or policy regardless of the number of core network resources of the first core network being shared with the virtual mobile network because the subscriber-related policy and/or charging control data are transmitted from the radio network element to the policy and/or charging control entity using only the first policy and/or charging control interface.

According to another embodiment of the present invention it is preferred that the at least one packet data core element comprises a packet core mobility element and a packet core gateway element, wherein the at least one policy and/or charging control interface comprises a further first policy and/or charging control interface related to the radio network element, wherein the method comprises the further step of:

transmitting the subscriber-related policy and/or charging control data, from the radio network element of the radio access network to the packet core mobility element of the first core network, using the further first policy and charging control interface.

Thereby, it is advantageously possible according to the present invention that the subscriber-related policy and/or charging control data are transmitted, to the policy and/or charging control entity, via the packet core mobility element—e.g. a serving gateway support node (SGSN), a mobility management entity (MME) or a Serving Gateway (SGW)—of the first core network. For example, the network route across the packet core mobility element is selected by the first core network, if the packet core mobility element is the only packet data core element of the first core network being shared with the mobile virtual network operator.

Furthermore, it is also preferred according to the present invention that the second policy and/or charging control interface is a dedicated policy and/or charging control interface being configured for direct communication between the at least one packet data core element and the policy and charging entity, wherein the method comprises the further step of:
  transmitting the subscriber-related policy and/or charging control data from the at least one packet data core element to the policy and/or charging control entity using the second policy and/or charging control interface.

Thereby, it is advantageously possible according to the present invention that the subscriber-related policy and/or charging control data are transmitted, to the policy and/or charging control entity, via the packet core mobility element—e.g. a serving gateway support node (SGSN), a mobility management entity (MME) or a Serving Gateway (SGW)—and/or via a packet core gateway element—e.g. a GGSN or packet data network gateway (PDN-GW) element—of the first core network. Preferably, a network route—across either only the packet core mobility element or across the packet core mobility element and the packet core gateway element—is selected, by the first core network, depending on the range of network sharing or roaming (i.e. depending on the number of network elements of the first core network 10 being shared) with the mobile virtual network operator.

Furthermore, it is also preferred according to the present invention that the second policy and/or charging control interface is a dedicated policy and/or charging control interface being configured for direct communication between the packet core gateway element and the policy and charging entity, wherein the method comprises the further steps of:
  transmitting the subscriber-related policy and/or charging control data from the packet core mobility element to the packet core gateway element,
  transmitting the subscriber-related policy and/or charging control data from the packet core gateway element to the policy and/or charging control entity using only the second policy and/or charging control interface.

Thereby, it is advantageously possible according to the present invention that an existing network route across the packet core mobility element and the packet core gateway element is selected, by the first core network, for policy and/or charging control.

Furthermore, it is also preferred according to the present invention that the mobile telecommunications network comprises a policy and charging enforcement function, wherein the policy and charging enforcement function is implemented on the radio network element, the packet core mobility element and/or the packet core gateway element.

Thereby, it is advantageously possible according to the present invention that enhanced policy and/or charging control is realized when a mobile telecommunications network is used by a user equipment corresponding to a subscriber of a virtual mobile network.

Furthermore, it is also preferred according to the present invention that the packet core mobility element and the radio access network are made available, by the first mobile network operator, to the mobile virtual telecommunications network using network sharing, wherein the mobile virtual telecommunications network comprises authorization information, the authorization information being related to the subscriber using the user equipment, wherein the authorization information are preferably stored in a home subscriber server or home location register of the mobile virtual telecommunications network.

Thereby, it is advantageously possible according to the present invention that full control over policy and/or charging is maintained even when network resources of the mobile telecommunications network are shared with an operator of a virtual mobile network.

The present invention also relates to a mobile telecommunications network for enhanced policy and/or charging control, the mobile telecommunications being configured to be used by a user equipment corresponding to a subscriber of a mobile virtual telecommunications network, wherein the mobile telecommunications network comprises a first core network, a second core network and a radio access network, wherein the radio access network comprises a radio network element being connected to the first and second core network, wherein a first mobile network operator is an operator of the first core network, wherein a second mobile network operator is an operator of the second core network and the radio access network, wherein the radio access network is a shared network for sharing of the radio access network among the first and second mobile network operator, wherein the first core network comprises at least one packet data core element and a policy and/or charging control entity, wherein the radio network element of the radio access network is configured to collect and/or generate subscriber-related policy and/or charging control data depending on a use of the radio access network by the user equipment, wherein the mobile telecommunications network is configured to transmit the subscriber-related policy and/or charging control data, from the radio network element to the policy and/or charging control entity, via at least one policy and/or charging control interface, wherein the at least one policy and/or charging control interface comprises:
  a first policy and/or charging control interface being configured for direct communication between the radio network element of the radio access network and the policy and/or charging control entity of the first core network, or
  a second policy and/or charging control interface being configured for a direct communication between the packet data core element and the policy and/or charging control entity.

According to the present invention, it is advantageously possible that a mobile telecommunications for enhanced policy and/or charging control is provided, wherein a mobile telecommunications network is used by a user equipment of a subscriber of a virtual mobile network such that full control over policy and/or charging is maintained even when network resources of the mobile telecommunications network are shared with an operator of a virtual mobile network. Preferably, the first mobile network operator is enabled to maintain full control over policy and/or charging within the first core network and the radio access network of the mobile telecommunications network—even in case that roaming, national roaming or network sharing is used. More preferably, the first mobile network operator maintains full control over charging and/or policy regardless of the number of core network resources of the first core network being shared with the virtual mobile network.

It is also possible and preferred according to the present invention that the first policy and/or charging control interface is a dedicated policy and/or charging control interface being configured for direct communication between the radio network element and the policy and/or charging control entity, wherein the mobile telecommunications network is configured to transmit the subscriber-related policy and/or charging control data, from the radio network element, directly to the policy and/or charging control entity using the first policy and/or charging control interface, or that the second policy and/or charging control interface is a dedicated policy and/or charging control interface being configured for direct communication between the at least one packet data core element and the policy and charging entity, wherein the mobile telecommunications network is configured to transmit the subscriber-related policy and/or charging control data, from the at least one packet data core element, directly to the policy and/or charging control entity using the second policy and/or charging control interface.

Thereby, it is advantageously possible according to the present invention that the first and second policy and/or charging control interface are realized in the mobile telecommunications network such that either the first or second policy and/or charging control interface is selectable, by the first core network, depending on a range of network sharing or roaming (i.e. depending on the number of network elements of the first core network 10 being shared) with the mobile virtual network operator.

It is also possible and preferred according to the present invention that the at least one packet data core element comprises a packet core mobility element and a packet core gateway element, wherein the packet core mobility element comprises a functionality of at least one of:
a serving gateway support node (SGSN),
a mobility management entity (MME),
a Service-Architecture-Evolution (SAE)-Gateway.

Thereby, it is advantageously possible according to the present invention that policy and/or charging control is realized topologically closer to the radio access network as compared to the state of the art such that the first mobile network operator maintains full control over policy and/or charging even in case of network sharing, roaming and/or national roaming.

It is also possible and preferred according to the present invention that the policy and charging entity is configured to provide, to the mobile telecommunications network, a functionality of at least one of:
an online charging system (OCS),
a billing domain (BD),
a policy control rule function (PCRF).

Thereby, it is advantageously possible according to the present invention that an online charging system (OCS), a billing domain (BD) and/or a policy control rule function is realized by the policy and/or charging control entity of the first core network.

The present invention also relates to a program comprising program code which, when executed on a computer, causes the computer to perform a method according to the present invention.

The present invention also relates to a computer program product for enhanced policy and/or charging control when a mobile telecommunications network or a mobile telecommunications network and a mobile virtual telecommunications network is used by a user equipment, the computer program product comprising a computer program stored on a storage medium, the computer program comprising program code which, when executed on a computer, causes the computer to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile telecommunications network 100 according to the present invention is schematically illustrated, wherein the mobile telecommunications network 100 is configured for enhanced policy and/or charging control. For example, the mobile telecommunications network 100 may correspond to a General Packet Radio Service (GPRS) network and/or a Universal Mobile Telecommunications System (UMTS) network and/or an Evolved Packet System (EPS) network.

The mobile telecommunications network 100 comprises a first core network 10 and a second core network 20. The first core network 10 is operated by a first mobile network operator and the second core network 20 is operated by a second mobile network operator. The mobile telecommunications network 100 further comprises a radio access network 30 being operated by the second mobile network operator and shared among the first and second mobile network operators. Preferably, this means that network resources of the radio access network 30 are usable by, both, the first and second mobile network operators.

The first core network 10 comprises at least one packet data core element, wherein the at least one packet data core element comprises a packet core mobility element 11 and a packet core gateway element 12. For example, the packet core mobility element 11 comprises a functionality of a serving gateway support node (SGSN) and the packet core gateway element 12 comprises a functionality of a Gateway GPRS Support Node (GGSN). Accordingly, the second core network 20 preferably comprises at least one further packet data core element, wherein the at least one further packet data core element comprises a further packet core mobility element 21 and a further packet core gateway element 22.

The radio access network 30 comprises a radio network element 31 being connected to the first and second core network 10, 20. For example, the radio network element 31 comprises or implements a controller—e.g. a radio network controller (RNC)—for a further radio network element 32—e.g. a NodeB. Moreover, the mobile telecommunications network 100 preferably still further comprises a further radio access network 40 being operated by the first mobile network operator, wherein the further radio access network 40 comprises another radio network element 41—e.g. another RNC—and another further radio network element 42—e.g. another NodeB.

The mobile telecommunications network 100 provides mobile telecommunications connectivity to a user equipment 51, when the radio access network 30 is used by the user equipment 51. The user equipment 51 may correspond to a subscriber of a mobile virtual telecommunications network 200. The mobile virtual telecommunications network 200 preferably comprises a home location register (HLR), online charging system (OCS), policy charging rules function (PCRF) and/or packet core gateway element (not shown). Preferably, the mobile virtual telecommunications network 200 comprises authorization information being related to the subscriber using the user equipment 51, wherein the authorization information are preferably stored in the home subscriber server (HSS) or home location register (HLR) of the mobile virtual telecommunications network 200. It is further preferred according to the present invention that the packet core mobility element 11 and the radio access network 30 are made available, by the first mobile network operator, to the mobile virtual telecommunications network 200 via network sharing via interface 200'. For example, the packet core mobility element 11—preferably the MME or 2G/3G SGSN—is the only packet data core element 11 of the first core network 10 which is shared with the mobile virtual network operator such that the first mobile network operator of the first core network 10 has no information regarding the authorization information stored in the home subscriber server (HSS) or home location register (HLR) of the mobile virtual telecommunications network 200.

The radio network element 31 of the radio access network 30 is configured to collect and/or generate subscriber-related policy and/or charging control data depending on the use of the radio access network 30 by the user equipment 51. In particular, charging and/or policy tickets are generated and/or aggregated at the further radio network element 32 (e.g. the NodeB being used by the user equipment 51) and forwarded—via a third policy and/or charging control interface 31'—to the radio network element 31 (e.g. a radio network controller—RNC), wherein the radio network element 31 collects and/or generates further policy and/or charging tickets. The subscriber-related policy and/or charging control data (including the policy and/or charging tickets and/or the further policy and/or charging tickets) are then transmitted from the radio network element 31 to a policy and/or charging control entity 13 of the first core network, via at least one policy and/or charging control interface 11', 12', 13', 13". Preferably, the policy and charging entity 13 is configured to provide, to the mobile telecommunications network 100, a functionality of at least one of an online charging system (OCS), a billing domain (BD) and a policy control rule function (PCRF).

According to one alternative embodiment of the present invention, the at least one policy and/or charging control interface 11', 12', 13', 13" comprises a first policy and/or charging control interface 13', the first policy and/or charging control interface 13' being configured for direct communication between the radio network element 31 of the radio access network 30 and the policy and/or charging control entity 13 of the first core network 10. Preferably the radio network element 31 (e.g. the radio network controller—RNC) has a dedicated interface for communication with the policy and/or charging entity 13. For example, it is thereby advantageously possible that the first mobile network operator is enabled to check whether the mobile virtual network operator follows policy guidelines being agreed between the first mobile network operator and the mobile virtual network operator.

According to a further alternative embodiment of the present invention, the at least one policy and/or charging control interface 11', 12', 13', 13" comprises a second policy and/or charging control interface 13" being configured for a direct communication between the packet data core element 11, 12 and the policy and/or charging control entity 13. For example, it is thereby advantageously possible that the SGSN comprises the subscriber-related policy and/or charging data, which are forwarded, via the GGSN, to the policy and/or charging control entity 13. Preferably, the subscriber-related policy and/or charging data are transmitted from the radio network element 31, via a further first interface 31', to the packet core mobility element 11 and from the packet core mobility element, via a further second interface 32', to the packet core gateway element 32 and from the packet core gateway element 32, via the second policy and/or charging control interface 13", to the policy and/or charging entity 13.

According to a still further alternative embodiment of the present invention, the subscriber-related policy and/or charging data are transmitted from the radio access network element 31, via the first policy and/or charging control interface 13', to the policy and/or charging control entity, wherein further subscriber-related policy and/or charging data (being related to another user equipment corresponding to another subscriber of another mobile virtual network operator) are transmitted from the radio access network element 31, via the second policy and/or charging control interface 13", to the policy and/or charging control entity.

Figure 2:
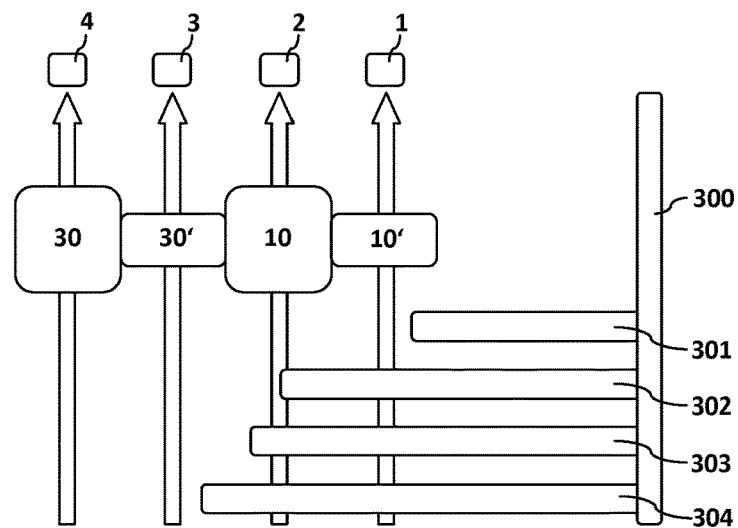
FIGS. 2 to 4 schematically illustrate examples of the use of a method according to the present invention.

In FIG. 2, an example of the use of a method according to the present invention is illustrated schematically. FIG. 2 shows that a varying number of network elements of the first mobile network operator are shared with (made available to) the virtual mobile network operator, wherein the mobile telecommunications network 100 comprises a first transmission connection 10' for accessing the first core network 10. The first core network 10 and the radio access network 30 are connected via a second transmission connection 30'. A first reference point 1 is related to the first transmission connection 10', wherein the first reference point 1 corresponds to a probe based reference point (i.e. for passive measurements). A second reference point 2 is related to the first core network 10 (which is herein also called packet core), wherein the second reference point 2 corresponds to a standardized interface for policy and/or charging control (i.e. measurements and/or active policy control). A third reference point 3 is related to the second transmission connection 30', wherein the third reference point 3 corresponds to a probe based reference point (i.e. for passive measurements). A fourth reference point 4 is related to the radio access network 30, wherein the fourth reference point 4 corresponds to a reference point for radio counter or performance measurements (i.e. measurements and/or active policy control). In FIG. 2, the range of network sharing or roaming is illustrated by means of reference numeral 300. In a first case (see reference numeral 301), the radio access network 30, the second transmission connection 30', the complete first core network 10 and the first transmission connection 10' are shared with at least one sharing/roaming partner (e.g. the mobile virtual network operator) such that the first mobile network operator is enabled to use each of the first, second, third and fourth reference point 1, 2, 3, 4 for full policy and/or charging control. In a second case (see reference numeral 302), the radio access network 30, the second transmission connection 30', at least parts of the first core network 10 (or the complete first core network 10) are shared with the at least one sharing/roaming partner such that the first mobile network operator is enabled to use the second reference point 2 and optionally the third and/or fourth reference point 3, 4 for full policy and/or charging control. In a third case (see reference numeral 303), the radio access network 30, the second transmission connection 30' and only parts of the first core network 10 are shared with sharing/roaming partners (e.g. the mobile virtual network operator) such that the first mobile network operator is enabled to use the third and fourth reference point 3, 4 for restricted policy and/or charging control. This means, in particular, that the second reference point 2 is excluded from being used by the first mobile network operator for policy and/or charging control. In a fourth case (see reference numeral 304), only the radio access network 30 and optionally the second transmission connection 30'—but not the first core network 10—are shared with sharing/roaming partners (e.g. the mobile virtual network operator) such that the first mobile network operator is enabled to use only the third and fourth reference point 3, 4 for policy and/or charging control. This means, in particular, that the first core network 10 is substantially excluded from being used by the first mobile network operator for policy and/or charging control. According to the present invention, it is advantageously possible that the first mobile network operator maintains full control over charging and/or policy regardless of the number of core network resources of the first core network being shared with the virtual mobile network because the subscriber-related policy and/or charging control data are transmitted from the radio network element 31 to the policy and/or charging control entity 13 using at least one of the first and second policy and/or charging control interface 13', 13" depending on the range of network sharing or roaming (i.e. depending on the number of network elements of the first core network 10 being shared with the mobile virtual network operator).

Figure 3:
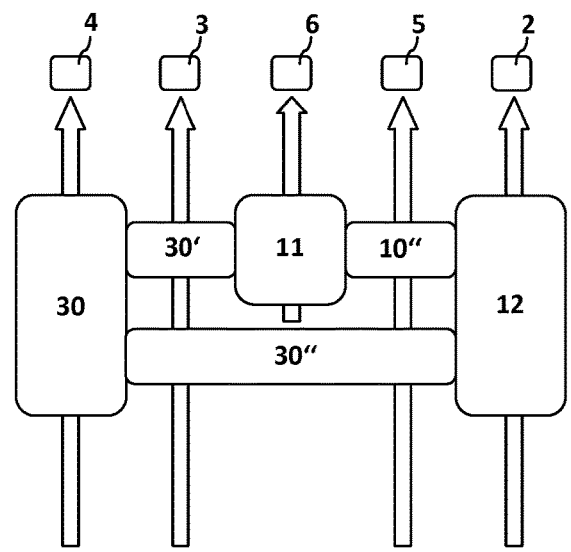

In FIG. 3, an example of the use of a method according to the present invention is illustrated schematically. The first core network 10 comprises at least one packet data core element, in particular a packet core mobility element 11 and a packet core gateway element 12. The radio access network 30 and the packet core mobility element 11 are connected via the second transmission connection 30', the packet core mobility element 11 and the packet core gateway element 12 are connected via a third transmission connection 10" of the first core network 10. A fifth reference point 5 is related to the third transmission connection 10", wherein the fifth reference point 5 corresponds to a probe based reference point (i.e. for passive measurements). A sixth reference point 6 is related to the packet core mobility element 11. Furthermore, a fourth transmission connection 30''' for using direct tunnelling is realized between the radio access network 30 and the packet core gateway element 12. When direct tunnelling is used, the first mobile network operator has limited (signalling based) charging capabilities as compared to a case where no direct tunnelling is used (wherein the charging is measurement based). Preferably, the third and/or sixth reference point 3, 6 include second generation (2G) and/or third generation (3G) network elements, more preferably at least one of a SGSN, MME, serving gateway (SGW), a Base Station Controller (BSC), a RNC and eNodeB. According to a preferred embodiment of the present invention, policy and/or charging control interfaces 13', 11', 12', 13"—in particular policy control, offline charging and/or online charging interfaces—are introduced at each of the fourth and sixth reference point 4, 6.

Figure 4:
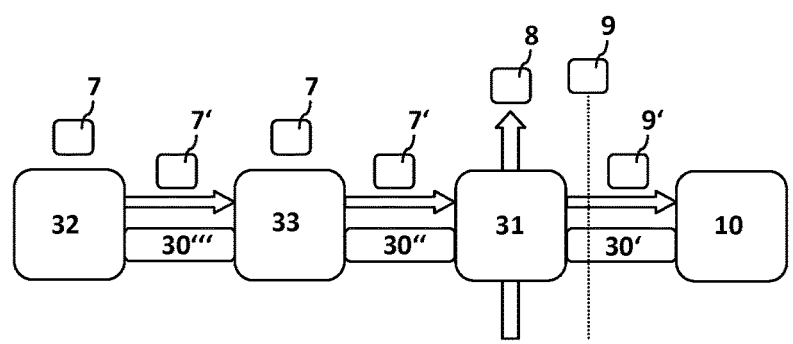

In FIG. 4, an example of the use of a method according to the present invention is illustrated schematically. The radio network element 31 of the radio access network 30 is connected to the first core network 10 via the second transmission connection 30'. Furthermore, the radio access network 30 comprises a further radio network element 32 and a still further radio network element 33, the still further radio network element 33 being connected to the radio network element 31 via a fifth transmission connection 30'' and the further radio network element 32 being connected to the still further radio network element 33 via a sixth transmission connection 30''', wherein the communication between the further radio network element 32 and the radio network element 31 is realized via the still further radio network element 33. For example, the radio network element 31 comprises or implements a controller—preferably a radio network controller or base station controller—for at least one of the further radio network element 32 and the still further radio network element 33, wherein at least one of the further radio network element 32 and the still further radio network element 33 comprise or implement a base transceiver station or NodeB or eNodeB. Preferably, the radio network element 31, the further radio network element 32 and/or the still further radio network element 33 are herein also called radio aggregate or repeater. A seventh reference point 7 is related to the further radio network element 32 and/or to the still further radio network element 33, wherein the further radio network element 32 and/or the still further radio network element 33 are configured to collect subscriber-related policy and/or charging data (being related to the subscriber of the user equipment 51 which is connected to the further radio network element 32 of the radio access network 30). A further seventh reference point 7' is related to the fifth and/or sixth transmission connection 30'', 30''' being used for submission (forwarding) of the subscriber related policy and/or charging data to the last radio network element 31. An eighth reference point 8 is related to the radio network element 31, which preferably realizes the last radio network element before a connection to the first core network 10. A ninth reference point 9 is related to a border between the radio access network 30 and the first core network 10. A further ninth reference point 11 is related to an inbound link. It is preferred according to the present invention that the (last) radio network element 31 collects the subscriber-related policy and/or charging data from each of the further and/or still further radio network element 32, 33. It is furthermore preferred according to the present invention that the (last) radio network element 31 comprises or implements the first policy and/or charging control interface 13' related to the direct communication between the radio network element 31 of the radio access network 30 and the policy and/or charging control entity 13 of the first core network 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced policy and/or charging control when a mobile telecommunications network is used by a user equipment corresponding to a subscriber of a mobile virtual telecommunications network,
    wherein the mobile telecommunications network comprises a first core network, a second core network and a radio access network, wherein the radio access network comprises a radio network element being connected to the first and second core networks, wherein the first core network is operated by a first mobile network operator, wherein the second core network and the radio access network are operated by a second mobile network operator, wherein the radio access network is shared among the first and second mobile network operators, wherein the first core network comprises at least one packet data core element and a policy and/or charging control entity, and
    wherein the method comprises:
    using, by the user equipment, the radio access network;
    collecting and/or generating, by the radio network element of the radio access network, subscriber-related policy and/or charging control data depending on the use of the radio access network by the user equipment; and
    transmitting the subscriber-related policy and/or charging control data, from the radio network element to the policy and/or charging control entity, using at least one policy and/or charging control interface, wherein the at least one policy and/or charging control interface comprises:
        a first policy and/or charging control interface related to a direct communication between the radio network element of the radio access network and the policy and/or charging control entity of the first core network, or
        a second policy and/or charging control interface related to a direct communication between the packet data core element and the policy and/or charging control entity.

2. The method according to claim 1, wherein the first policy and/or charging control interface is a dedicated policy and/or charging control interface being configured for direct communication between the radio network element and the policy and/or charging control entity, and
    wherein the method further comprises:
    transmitting the subscriber-related policy and/or charging control data from the radio network element to the policy and/or charging control entity using the first policy and/or charging control interface.

3. The method according to claim 1, wherein the at least one policy and/or charging control interface comprises only the first policy and/or charging control interface.

4. The method according to claim 1, wherein the at least one packet data core element comprises a packet core mobility element and a packet core gateway element, wherein the at least one policy and/or charging control interface comprises a further first policy and/or charging control interface related to the radio network element, and
    wherein the method further comprises:
    transmitting the subscriber-related policy and/or charging control data, from the radio network element of the radio access network to the packet core mobility element of the first core network, using the further first policy and charging control interface.

5. The method according to claim 1, wherein the second policy and/or charging control interface is a dedicated policy and/or charging control interface being configured for direct communication between the at least one packet data core element and the policy and charging entity, and
    wherein the method further comprises:
    transmitting the subscriber-related policy and/or charging control data from the at least one packet data core element to the policy and/or charging control entity using the second policy and/or charging control interface.

6. The method according to claim 5, wherein the second policy and/or charging control interface is a dedicated policy and/or charging control interface being configured for direct communication between a packet core gateway element and the policy and charging entity, and
    wherein the method further comprises:
    transmitting the subscriber-related policy and/or charging control data from a packet core mobility element to the packet core gateway element; and
    transmitting the subscriber-related policy and/or charging control data from the packet core gateway element to the policy and/or charging control entity using only the second policy and/or charging control interface.

7. The method according to claim 1, wherein the mobile telecommunications network comprises a policy and charging enforcement function, wherein the policy and charging enforcement function is implemented on the radio network element, the packet core mobility element and/or the packet core gateway element.

8. The method according to claim 1, wherein the packet core mobility element and the radio access network are made available, by the first mobile network operator, to the mobile virtual telecommunications network using network sharing, wherein the mobile virtual telecommunications network comprises authorization information, the authorization information being related to the subscriber using the user equipment.

9. A mobile telecommunications network for enhanced policy and/or charging control, the mobile telecommunications being configured to be used by a user equipment corresponding to a subscriber of a mobile virtual telecommunications network, wherein the mobile telecommunications network comprises:
   a first core network;
   a second core network; and
   a radio access network;
   wherein the radio access network comprises a radio network element being connected to the first and second core networks;
   wherein a first mobile network operator is an operator of the first core network;
   wherein a second mobile network operator is an operator of the second core network and the radio access network;
   wherein the radio access network is a shared network for sharing of the radio access network among the first and second mobile network operators;
   wherein the first core network comprises at least one packet data core element and a policy and/or charging control entity;
   wherein the radio network element of the radio access network is configured to collect and/or generate subscriber-related policy and/or charging control data depending on a use of the radio access network by the user equipment; and
   wherein the mobile telecommunications network is configured to transmit the subscriber-related policy and/or charging control data, from the radio network element to the policy and/or charging control entity, via at least one policy and/or charging control interface, wherein the at least one policy and/or charging control interface comprises:
      a first policy and/or charging control interface being configured for direct communication between the radio network element of the radio access network and the policy and/or charging control entity of the first core network, or
      a second policy and/or charging control interface being configured for a direct communication between the packet data core element and the policy and/or charging control entity.

10. The mobile telecommunications network according to claim 9, wherein:
   the first policy and/or charging control interface is a dedicated policy and/or charging control interface being configured for direct communication between the radio network element and the policy and/or charging control entity, wherein the mobile telecommunications network is configured to transmit the subscriber-related policy and/or charging control data, from the radio network element, directly to the policy and/or charging control entity using the first policy and/or charging control interface, or
   the second policy and/or charging control interface is a dedicated policy and/or charging control interface being configured for direct communication between the at least one packet data core element and the policy and charging entity, wherein the mobile telecommunications network is configured to transmit the subscriber-related policy and/or charging control data, from the at least one packet data core element, directly to the policy and/or charging control entity using the second policy and/or charging control interface.

11. The mobile telecommunications network according to claim 9, wherein the at least one packet data core element comprises a packet core mobility element and a packet core gateway element, wherein the packet core mobility element comprises a functionality of:
   a serving gateway support node (SGSN), and/or
   a mobility management entity (MME), and/or
   a Service-Architecture-Evolution (SAE)-Gateway.

12. The mobile telecommunications network according to claim 9, wherein the policy and charging entity is configured to provide, to the mobile telecommunications network, a functionality of:
   an online charging system (OCS), and/or
   a billing domain (BD), and/or
   a policy control rule function (PCRF).

13. A non-transitory computer-readable medium having processor-executable instructions stored thereon for enhanced policy and/or charging control when a mobile telecommunications network is used by a user equipment corresponding to a subscriber of a mobile virtual telecommunications network,
   wherein the mobile telecommunications network comprises a first core network, a second core network and a radio access network, wherein the radio access network comprises a radio network element being connected to the first and second core networks, wherein the first core network is operated by a first mobile network operator, wherein the second core network and the radio access network are operated by a second mobile network operator, wherein the radio access network is shared among the first and second mobile network operators, wherein the first core network comprises at least one packet data core element and a policy and/or charging control entity, and
   wherein the processor-executable instructions, when executed, facilitate the following:
   using, by the user equipment, the radio access network;
   collecting and/or generating, by the radio network element of the-radio access network, subscriber-related policy and/or charging control data depending on the use of the radio access network by the user equipment; and
   transmitting the subscriber-related policy and/or charging control data, from the radio network element to the policy and/or charging control entity, using at least one policy and/or charging control interface, wherein the at least one policy and/or charging control interface comprises:
      a first policy and/or charging control interface related to a direct communication between the radio network element of the radio access network and the policy and/or charging control entity of the first core network, or
      a second policy and/or charging control interface related to a direct communication between the packet data core element and the policy and/or charging control entity.

* * * * *